(12) United States Patent
Bredenberg et al.

(10) Patent No.: US 10,089,637 B2
(45) Date of Patent: Oct. 2, 2018

(54) HEAT-MAP INTERFACE

(75) Inventors: Steven C. Bredenberg, Campbell, CA (US); Michael Froimowitz Greenzeiger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 750 days.

(21) Appl. No.: 13/549,359

(22) Filed: Jul. 13, 2012

(65) Prior Publication Data

US 2014/0019461 A1   Jan. 16, 2014

(51) Int. Cl.
| | |
|---|---|
| G06F 17/30 | (2006.01) |
| G06F 9/451 | (2018.01) |
| G06Q 30/02 | (2012.01) |

(52) U.S. Cl.
CPC ............ *G06Q 30/02* (2013.01); *G06F 9/451* (2018.02); *G06F 17/30994* (2013.01)

(58) Field of Classification Search
CPC ............. G06F 17/3087; G06F 11/3082; G06Q 30/0277
See application file for complete search history.

(56) References Cited

U.S. PATENT DOCUMENTS

| | | | |
|---|---|---|---|
| 8,379,053 B1* | 2/2013 | Phillips et al. | ............... 345/619 |
| 8,487,959 B1* | 7/2013 | Khan et al. | ................... 345/619 |
| 2008/0148155 A1 | 6/2008 | Kogan et al. | |
| 2010/0169792 A1 | 7/2010 | Ascar et al. | |
| 2010/0198626 A1 | 8/2010 | Cho et al. | |
| 2010/0332962 A1 | 12/2010 | Hammer et al. | |
| 2011/0038542 A1 | 2/2011 | Barkan et al. | |
| 2011/0141136 A1* | 6/2011 | Cardno et al. | ................ 345/606 |
| 2011/0154239 A1 | 6/2011 | Dheap et al. | |
| 2012/0072578 A1* | 3/2012 | Alam | ............................ 709/224 |

(Continued)

FOREIGN PATENT DOCUMENTS

WO    WO 2011128514 A1 * 10/2011

OTHER PUBLICATIONS

Choros, Kazimierz, and Monika Muskala. "Block map technique for the usability evaluation of a website." In Computational Collective Intelligence. Semantic Web, Social Networks and Multiagent Systems, pp. 743-751. Springer Berlin Heidelberg, 2009.*

(Continued)

*Primary Examiner* — Jason G Liao
(74) *Attorney, Agent, or Firm* — Polsinelli LLP

(57) ABSTRACT

Disclosed herein are systems, methods, and non-transitory computer-readable storage media for presenting event data in a heat-map interface. Event data describing user interactions with a content item can be gathered and used to generate the heat map. The gathered event data can be filtered prior to processing to exclude unnecessary or irrelevant event data. The event data can be filtered based on numerous criteria such as a determined type of user interaction, demographic data, location of the event data, content item, etc. Filtering rules can be based on an analysis of the content item to determine what event data to exclude and current performance of the system. The filtered event data can be presented in a heat-map interface that represents the frequency at which event data occurs on an item of content based on location. The event data is analyzed to determine optimization rules that dictate selection of content items.

21 Claims, 4 Drawing Sheets

(56) References Cited

U.S. PATENT DOCUMENTS

2012/0253858 A1* 10/2012 Glissmann et al. ......... 705/7.11
2013/0328921 A1* 12/2013 Kuppusamy .................. 345/629
2014/0180844 A1* 6/2014 Pisaris-Henderson ..... 705/14.73

OTHER PUBLICATIONS

Choroś, Kazimierz. "Further tests with click, block, and heat maps applied to website evaluations." In Computational Collective Intelligence. Technologies and Applications, pp. 415-424. Springer Berlin Heidelberg, 2011.*

* cited by examiner

HEAT-MAP INTERFACE

BACKGROUND

1. Technical Field

The present disclosure relates to event data and more specifically to presenting event data in a heat-map interface.

2. Introduction

Increasingly, content providers are not only concerned with how to assemble content that includes rich media content items with the potential to engage the end users in deep interactions, but also with monitoring and tracking of such interactions. Monitoring these interactions has become very important to content providers as these interactions indicate whether a content item has been successful in engaging the audience. Additionally, the interactions can be used to provide feedback to content providers on how users might prefer to engage with content items. Further, such feedback can also be used to evaluate how the content items can be improved to produce content items that engage a wider range of end users or to increase the level of engagement between end users with the content items in the future.

Conventional implementations for monitoring the performance of content items focus on monitoring successful interactions such as clicks received on active components of the content. While monitoring these types of interactions does provide an indication of how successful the content is in eliciting specific type of responses, it does not tell the whole story of the user experience with the content. In particular, unsuccessful interactions are ignored. Thus, information that can provide valuable insight into other aspects of the user experience with the content is not being harvested.

Monitoring unsuccessful interactions, however, presents several hurdles. One hurdle is a result of the fact that, unlike successful interactions, an unsuccessful interaction often does not result in an outcome that can be counted or registered. An unsuccessful interaction does not conclude in a button or link being accessed as is the case with a successful interaction. Thus, monitoring unsuccessful interactions requires monitoring of all interactions, rather than just results. Accordingly, a significant amount of resources can be required for exchanging and processing data regarding such interactions. Consequently, a need exists for an improved method to monitor both successful and unsuccessful interactions with content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for presenting event data in a heat-map interface. One way of presenting user interactions with a content item is through use of a heat-map which displays aggregated user interactions in an extremely intuitive way. At a glance, it can be easily determined where on an item of content thousands of users are focusing their attention. This can quickly provide a content provider with information that the users are focusing exactly where the content providers want them to be focusing, or that users are trying to interact in places where no interaction has been pre-defined. This latter scenario can indicate that the users, or at least a specific subset of users, may be confused by the content.

Content providers can respond to this type of negative feedback by changing the layout of the content to a less confusing layout.

Event data describing user interactions with a content item can be gathered as it is received and used to generate the heat map. Processing large amounts of event data can be a time consuming and computationally intensive task and thus the gathered event data can be filtered prior to processing to exclude unnecessary or irrelevant event data. The event data can be filtered based on numerous criteria such as a determined type of user interaction, demographic data, location of the event data, content item, etc. In some embodiments, the system can determine filtering rules based on an analysis of the content item to determine what event data to exclude. Further, the filtering rules can meter the filtering of event data based upon the current performance of the system. For example, this can be based on a current network connection or resource usage associated with the system.

The filtered event data can be presented in a heat-map interface that represents the frequency at which event data occurs on an item of content based on location. The frequency can be represented in numerous ways, such as through the use of colors, grayscale, patterns, letters, numbers, etc. The resulting heat-map provides an easy to read map of where user interaction is focused on an item of invitational content.

In some embodiments, the event data can be analyzed by the system to determine optimization rules used in selecting variants of the content. The optimization rules can dictate which variant is best optimized based on audience, demographic data, location, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
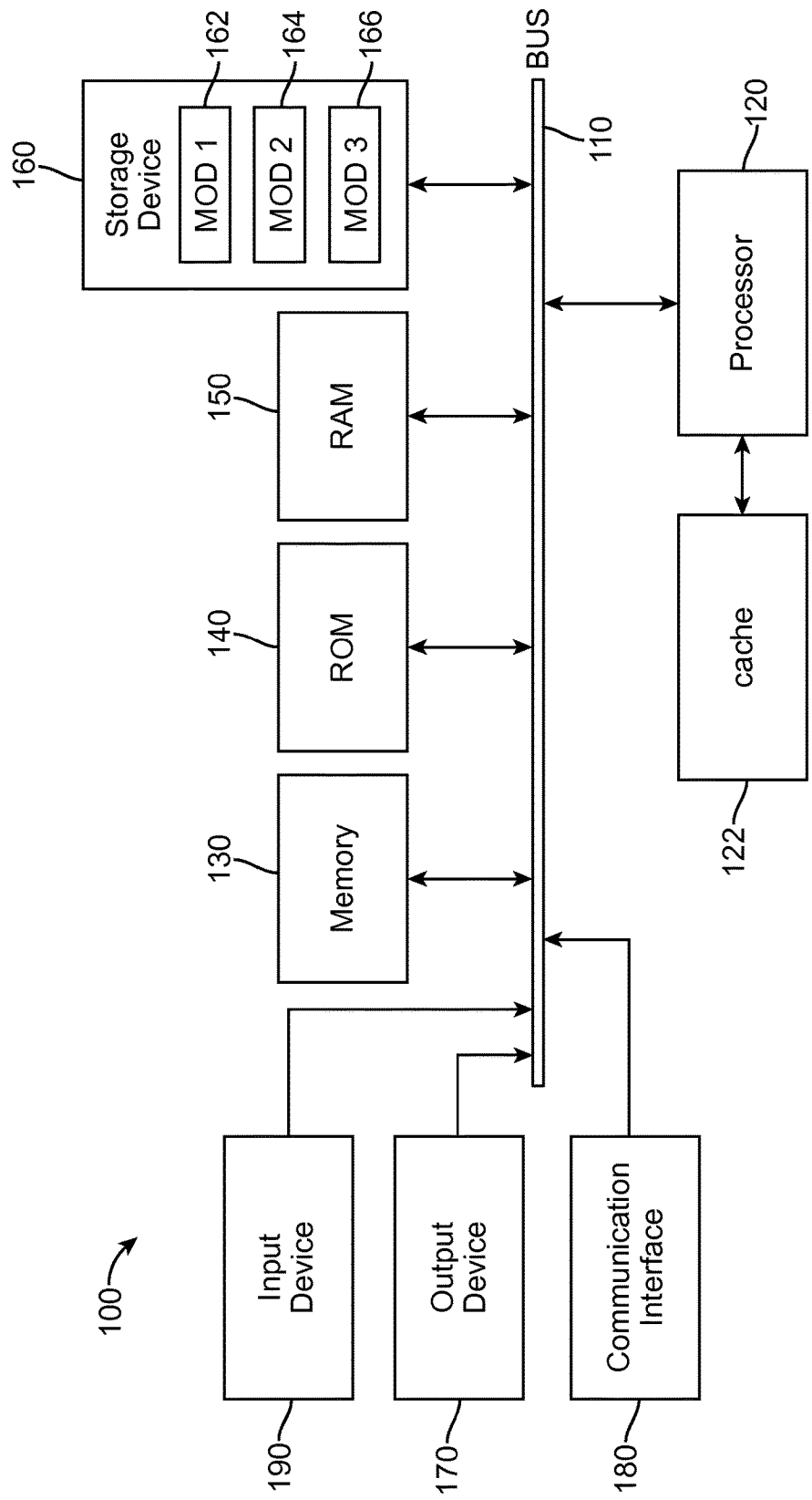
FIG. 1 illustrates an exemplary system that includes a general-purpose computing device.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
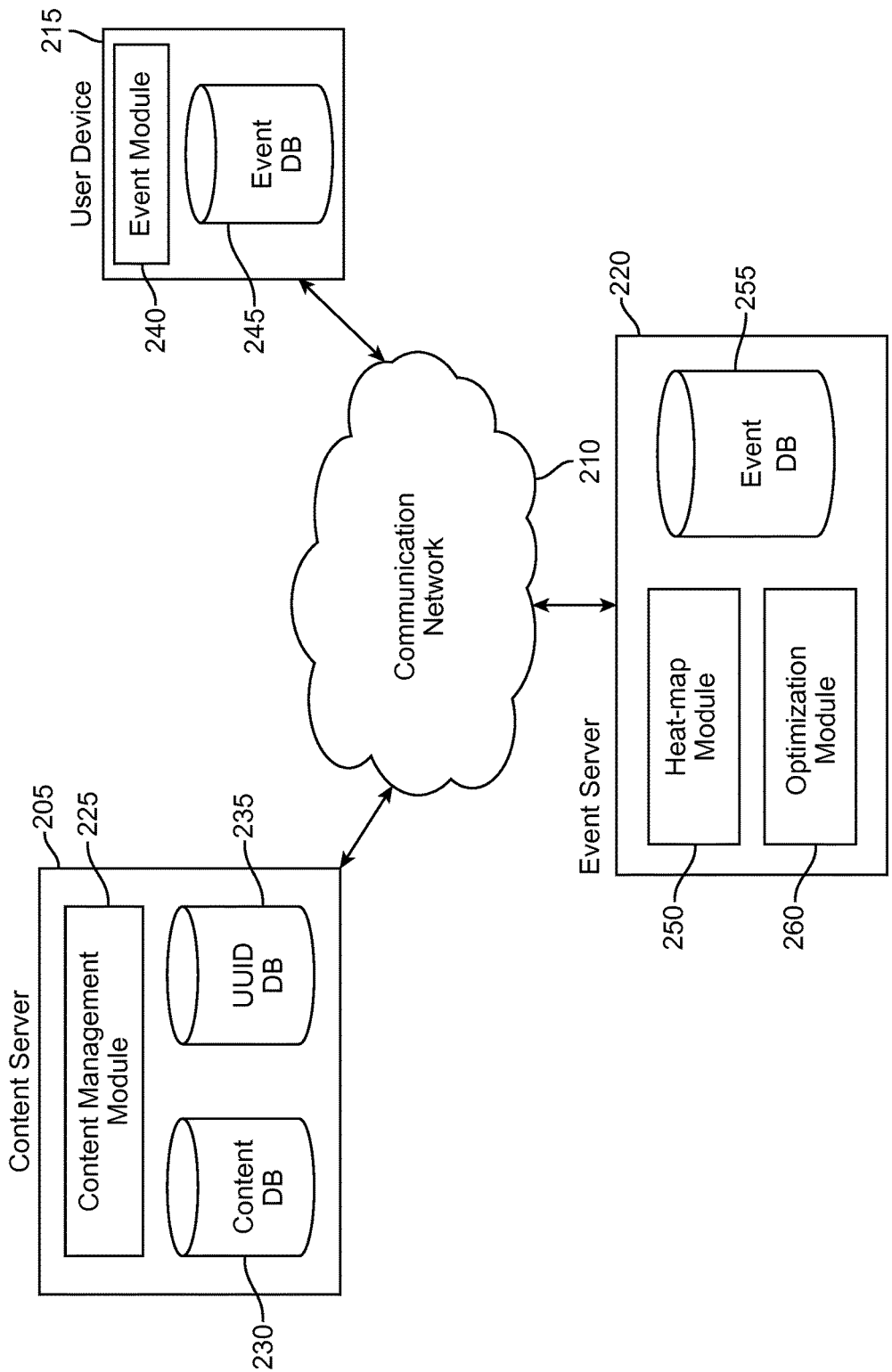
FIG. 2 illustrates a general purpose computing environment wherein gathered event data can be viewed in a heat map interface.

Having disclosed some components of a computing system, the disclosure now turns to FIG. 2, which illustrates a general purpose computing environment 200 wherein gathered event data can be viewed in a real-time heat map interface. As illustrated, multiple computing devices can be connected to a communication network and be configured to communicate with each other through use of the communication network. The communication network 210 can be any type of network, including a local area network ("LAN"), such as an intranet, a wide area network ("WAN"), such as the internet, or any combination thereof. Further, the communication network 210 can be a public network, a private network, or a combination thereof. The communication network can also be implemented using any type or types of physical media, including wired communication paths and wireless communication paths associated with one or more service providers. Additionally, the communication network 210 can be configured to support the transmission of messages formatted using a variety of protocols.

Multiple computing devices can be connected to the communication network. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 100 of FIG. 1. To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As illustrated in FIG. 2, the exemplary system includes three computing devices in network communication with each other: a content server 205, a user device 215 and an event server 220.

The content server 205 can be configured to deliver invitational content to the user device 215. In particular, the content server 205 can be configured to receive a request for a content package of electronic-invitational content, such as a web page, an application, a game, or media, etc., from user device 215. In the various embodiments, one or more types of invitational content can be combined in a content package. The user device 215 can be configured to render the received invitational content. This can include display or playing the invitational content appropriately depending on the form of the invitational content. For example, the invitational content can include text, graphics, audio, video, executable code or any combination thereof.

Upon successfully rendering the delivered invitational content, the user device 215 can be configured to send a notification to the content server 205. In some embodiments the notification can be a web beacon such as an embedded tracking pixel. In some embodiments the operating system of the user device 215 is configured to report rendering of the invitational content. In some embodiments, the notification can be cryptographically secured by means such as authentication and digests.

In some embodiments, the invitational content can be associated with a product or can directly or indirectly advertise a product. In some embodiments, the content package can be configured to replace or update invitational content in a content package already delivered to the user terminal.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. In some embodiments, active invitational content can include secondary views that can be presented to a user upon selection of an initial view of the invitational content. For example, the initial view can be a banner advertisement that, when selected, directs the user to a secondary view such as a multimedia advertisement.

However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content server 205 selects the invitational content in response to the request and transmits the assembled invitational content to the requesting user device 215. In some embodiments, the content server has preselected the invitational content before the request is received. Thereafter, the content server 205 assembles a content package of invitational content and causes the content package to be delivered to the user device 215.

The content server 205 can include a content management module 225 that facilitates generation of the assembled content package, which can include invitational content. Specifically, the content management module can combine content from one or more content providers to generate the assembled content package for the user device 215. In some embodiments, the content management module 225 can request invitational content from a secondary content server (not shown) in network communication with the content server 205 to generate the assembled content package for the user device 215. In some embodiments, the content management module 225 can request that the secondary content server deliver the invitational content directly to the user device 215.

In some embodiments, the content server 205 can include a content database 230 configured to store invitational content and the content management module 225 can select invitational content from the content database 230 to generate the assembled content package for the user device 215. The data in the content database 230 can be refreshed or updated on a regular or dynamic basis to ensure that the content in the database 230 is up-to-date at the time of a request from the user device 215.

In some embodiments, there can be multiple variants of an item of invitational content, and the content management module 225 can be configured to select proper variants to generate the assembled content package for the user device 215. For example, the entire item of invitational content can be offered in variant forms and the content management module 225 can select one of the variants. In some embodiment, the item of invitational content can be assembled by combining multiple parts and a variant of each part can be offered such that the content management module 225 can select a variant of each part to assemble the item of invitational content.

Variants of invitational content can be selected in numerous ways and based upon numerous criteria. For example, in some embodiments the content management module 225 can be configured to select from multiple variant forms of invitational content based upon demographic data associates with the user of the user device 215. Thus, a variant of an item of invitational content determined to be optimal for a specified demographic group can be selected upon a determination that the user of the user device 215 is a part of that demographic group. Demographic data can be collected from the user device 215, or in some embodiments, from a stored user profile associated with the user device 215 (described below).

In some embodiments, the content management module 225 can be configured to select a variant form of invitational content based upon the user device 215, a determined network connection associated with the user device 215, or based upon any other factors or criteria. For example, some variants of the item of invitational content can be better suited to be rendered on specific types of devices. For example, some user devices can be configured to only support certain media types, and the content management module 225 can be configured to select a variant of the invitational content that includes a media type that is compatible with the user device 215.

Alternatively, the content management module 225 can be configured to select a variant form of invitational content based upon the determined network connection associated with the user device 215. For example, the content management module 225 can be configured to select a less resource intensive variant of the invitational content upon a determination that the user device 215 is connected via a low bandwidth network connection. Alternatively, the content management module 225 can select a higher resource intensive variant of the invitational content upon a determination that the user device 215 is connected via a high bandwidth connection.

In some embodiments, the invitational content can be assembled at the user device 215. For example, the invitational content parts can be delivered to the user device 215 and assembled at the user device 215 based on assembly rules dictating how to properly assemble the invitational content together. In some embodiment, the assembly rules can be delivered to the user device 215 by the content server 205, at the same or different times as the invitational content parts.

In the various embodiments, the content server 205 can also include a unique user identifier (UUID) database 235 that can be used for managing sessions with multiple user devices 215. The UUID database 235 can be used with a variety of session management techniques. For example, the content server 205 can implement an HTTP cookie or any other conventional session management method (e.g., IP address tracking, URL query strings, hidden form fields, window name tracking, authentication methods, and local shared objects) for user devices 215 connected to content server 215 via a substantially persistent network session. However, other methods can be used as well. For example, in the case of handheld communications devices, such as mobile phones, smart phones, tablets, or other types of user devices 215 connecting using multiple or non-persistent network sessions, multiple requests for content from such devices may be assigned to a same entry in the UUID database 235. The content server 205 can analyze the attributes of requesting user devices 215 to determine whether such requests can be attributed to the same user. Such attributes can include device or group-specific attributes.

The UUID database 235 can also contain demographic data associated with a stored UUID. For example, demographic data can include a user's name, address, age, likes, dislikes, previous history, etc. The demographic data can be received from a user of a user device 215 or inferred from data collected by the content server 205. For example, user likes and dislikes can be inferred from a user's previous requests for invitational content and user interaction with the invitational content.

In addition to requesting and rendering invitational content, the user device 215 can also be configured to gather event data in relation to a rendered item of invitational content. Event data can be any type of data describing an event or action received by the user device 215 via the input device(s) of the user device 215. For example, event data can be an action performed on a touch screen of the user device 215 such as a tap-down or tap-up on the touch screen. A touch screen is just one possible example of an input device and the present disclosure contemplates that event data can be data received from any other type of input device, including, but not limited to a button, a mouse, a touch pad, a microphone, or a keyboard. Thus, the action or event with the input device can be any type of input, including, but not limited to a click, a tap, a release, a scroll, a sound, a movement, or a scroll.

In addition to the actual action or event, event data can also include event metadata describing the event. For example, event metadata can include the type of input device from which the event was received, a location of the event, a time and/or date of the event, etc. Event metadata can also include data about the rendered item of invitational content that the event was performed in relation to. For example, the event metadata can include an identifier that identifies the specific item of invitational content, including any variant or variant sections of the invitational content. Event metadata can also include data about how the user device 215 is displaying content, such as the screen orientation, resolution, zoom, font size, color mode, etc. In some embodiments, event metadata can also include data describing the user device such as the type of device, capabilities of the device, network connection associated with the device, etc. Further, in some embodiments, event metadata can include geo-location data describing the location of the user device from which the event data was gathered. In some embodiments, the event meta-data can include key performance indicators (KPI) such that further define the success of the item of invitational content. For example KPU can include data such as the time a user spent viewing the invitational content, the number of items of invitational content viewed by the user, etc.

The types of event metadata given above are examples and are not meant to be limiting. One skilled in the art would recognize that any type of event metadata describing the event can be included. For example, in relation to a tap-down received by a touch screen, other types of metadata can include the force or intensity with which the tap was received, the size of the tap-down (i.e. radius or dimensions of the input), movement associated with the tap-down, etc. Similar types of metadata can be obtained and used for other types of input devices.

To gather event data, the user device 215 can include an event module 240 configured to monitor input received by the user device 215. For example, the event module 240 can be configured to communicate with the operating system running on the user device 215 to gather event data from input devices of the user device 215 as well as event metadata including the invitational content being rendered, screen orientation, etc.

In some embodiments, the event module 240 can be a thin software layer running as part of a rendering application configured to render invitational content. For example, the event module 240 can be running as part of a web browser or other application capable of rendering invitational content on the user device 215. The event module 240 can thus be configured to gather event data and event metadata from the rendering application.

In some embodiments, the user device 215 can include an event database 245 configured to store event data and the event module 240 can be configured to store the gathered event data in the event database 245.

In addition to gathering event data, the event module 240 can also be configured to transmit the event data to an event server 220 in network communication with the user device 215. The event module 240 can be configured to transmit the event data in numerous ways. For example, in some embodiments the event module 240 can transfer the event data as it is gathered. In some embodiments, the event module 240 can transmit the event data in batches based upon a schedule such as every minute or upon a predetermined amount of data being gathered by the event module 240. In addition to transmitting the event data, the event module 240 can also transmit data identifying the user device 215, such as the UUID or demographic data associated with the UUID.

In some embodiments, the event module 240 can also be configured to filter the event data that is transmitted to the event server 220. For example, event data can be filtered so that only relevant or necessary event data is transmitted to the event server 220 and unnecessary event data is excluded. Filtering the event data that is transmitted can reduce resource usage and thus increase performance, especially over loaded or high latency networks.

Event data can be filtered in numerous ways. In some embodiments, the event module 240 can be configured to filter transmission of event data based upon a determined type of user interaction. The event module 240 can be configured to analyze the gathered event data to distinguish the types of interactions. For example, the event module 240 can be configured categorize the event data into one of numerous types of user interactions. In the case of a touch screen device, these can include a click, a double-click, a swipe, a scroll, a pinch, etc. Upon categorizing the event data, the event module 240 can be configured to only transmit event data categorized as certain types of interactions. For example, in some embodiments, the event module can be configured to transmit only event data categorized as a click. The remaining event data can be discarded, or in some embodiments, stored in the event database.

To determine the types of interactions, the event module 240 can be configured to use various heuristics for separating out events and categorizing them. The heuristics can include analyzing the distance between a tap-down and tap-up event as well as the time between the tap-down and tap-up event, to determine the user's intended interaction. For example, a tap-down followed by an immediate tap-up at the same location can be determined to be a click at the location, whereas a tap-down followed by a tap up at a location over a predetermined distance away can be determined to be a swipe.

Further, the time between the tap-down and tap-up can be used to determine a velocity of a swipe and intermediate recorded points can be used to determine the path of the swipe. The time between two determined clicks and the location between two determined clicks can also be used to determine whether the two clicks were intended to be two separate clicks or one double click. For example, the closer in location and time the two clicks are, the more likely it is that the two clicks were intended to be a single double click.

In addition to filtering the event data based on a determined type of interaction. The event data can also be filtered based on the item of invitational content associated with the event data. For example, in some embodiments, the event module 240 can be configured to only transmit event data associated with certain items of invitational content. The event module can determine which items of invitational content require transmission of associated event data in numerous ways. For example, in some embodiments, the item of invitational content can include a flag or identifier indicating that event data associated with the item of invitational content should be transmitted to the event server. Conversely, the flag or identifier can indicate that event data associated with the item of invitational content should not be transmitted to the event server. In some embodiments, a list of items of invitational content from which associated event data should be transmitted can be stored on the user device 215 and the event module 240 can check the list to determine whether to transmit the event data. For example, the list can be stored in the event database and the event module can be configured to access the list to determine whether to transmit event data.

In some embodiments, the types of event data transmitted can vary based upon the associated invitational content. For example, each item of invitational content can have different rules regarding how event data should be filtered prior to transmission to the event server.

In some embodiments, the event module 240 can be configured to filter event data based upon the location of the event data in relation to the item of invitational content. For example, a content provider may only be interested with user interaction within a specified portion of an item of invitational content and the event module 240 can be configured to only transmit event data that occurred within the specified portion.

In some embodiments, the event module 240 can be configured to filter event data based on the user device 215. For example, the event module can be configured to transmit event data from only certain types of user devices. In some embodiments, the types or amount of event data transmitted can vary based upon the type of use device.

In some embodiments, the event module 240 can be configured to filter event data based upon user demographic data. For example, the event module 240 can be configured to only transmit event data received from users with specific demographic data. Alternatively, the event module 240 can be configured to vary the types of event data that are transmitted based on the demographic data. In some embodiments, the event module 240 can be configured to filter event data based upon KPI, temporal or geo-location data. For example, the event module 240 can be configured to only transmit event data received during certain time periods or collected from a user device 215 in a certain geographic location.

In some embodiments, the event module 240 can be configured to automatically determine rules to filter event data. For example, the event module can be configured to automatically filter event data based upon the associated item of invitational content. The event module 240 can be configured to analyze the item of invitational content to determine filtering rules for filtering event data. For example, in some embodiments, the event module 240 can determine what types of user interactions should be transmitted to the event server based upon the possible types of user interactions defined by the item of invitational content. For example, if an item of invitational content defines use of only clicks, the event module 240 can define a rule that only event data categorized as clicks be transmitted to the event server.

Additionally, in some embodiments, the event module 240 can set rules based upon the location of actionable areas of an item of invitational content. For example, the event module 240 can set a rule that only event data within a specified distance of an actionable area, such as a button or other Graphical User Interface (GUI) element be transmitted to the event server.

Alternatively, the event module 240 can be configured to determine rules based upon variant sections of the item of invitational content. For example, an item of invitational content can include a variant section that can be varied by the content server 205. The event module 240 can determine that event data taking place within or near this variant section or area is of higher importance and thus set rules that event data occurring within this area be transmitted to the event server 220.

In some embodiments, the event module 240 can be configured to vary the filtering of event data based upon current network capabilities or resource usage of the user device 215. For example, the event module 240 can be configured to monitor the network connection type of the user device 215 and/or current network resource usage of the user device 215 to determine what event data to transmit to the event server 220. If a high bandwidth network connection is in use and/or current network resource usage is low, the event module 240 can be configured to transmit a larger variety of event data than if a low bandwidth connection is in use. For example, the event module 240 can be configured to transmit a predetermined minimum amount of event data and increase that amount based upon the current network capabilities or resource usage. If bandwidth/resources are available, the event module 240 can be configured to transmit more event data than the predetermined minimum amount. For example, the event module 240 can be configured to transmit, at minimum, all event data determined to be a click. The event module 240 can thus transmit event data determined to be other types of user interactions upon a determination that there is sufficient bandwidth to facilitate the additional data transmissions.

The above examples are just some possible embodiments of filtering event data. One skilled in the art would recognize that event data can be filtered in any number of ways using any number of criteria, including those described above, or combinations thereof. Further, although filtering event data is described as being performed by the user device 215, this is just one possible embodiment and this disclosure considers embodiments, in which the filtering is performed on a separate computing device, including the event server 220.

The event server 220 can be configured to receive event data from a plurality of user devices 215 and display the event data in a heat-map interface. To facilitate this, the event server 220 can include a heat-map module 250 configured to receive event data. The heat-map module 250 can be an application such as a daemon running on the event server 220 configured to receive event data. Upon receiving the event data, in some embodiments the heat-map module 250 can be configured to store the event data in an event database 255 configured to store event data. Storing the event data as it is received allows for, among other thing, later unspecified processing or rebuilding of other databases in the event of a catastrophic failure or for further uses not contemplated at the time the event data is received.

The heat-map module 250 can also be configured to present the event data in a real-time heat-map interface indicating the frequency at which an interaction occurred on an item of invitational content based on location. For example, the heat-map can be displayed over the item of invitational content to indicate the frequency at which the interaction occurred at each point on the item of invitational content.

The heat-map can indicate the frequency in numerous ways such as using different colors, patterns, grayscale, letters, numbers, etc. to represent a higher or lower frequency. For example, red can represent a point of high interaction while blue can indicate a point of low interaction. A heat map laid over the item of invitational content can thus clearly indicate areas where interaction with the item of invitational was high and areas where interaction was low.

To determine the frequency at each point, in some embodiments, the heat-map module 265 can increment frequency data stored in a two-dimensional array that represents the coordinates of the item of invitational content. Each node of the two dimensional array can represent a location on the item of invitational content and each node can include frequency data indicating the number of the times an event has occurred at the location. For example, in some embodiments, the frequency data can be an integer and, upon receiving event data that an event occurred at the location, the integer stored in the corresponding node can be incremented. Further, a count of the total number of recorded events can be kept and incremented upon a new event occurring. The frequency at each point can be determined by dividing the integer stored in each node by the overall number of recorded events. The resulting percentage can be used to determine the frequency and be associated with an appropriate visual representation, such as a color, to present on the heat-map.

In some embodiments, the frequency data can be determined by applying different weights to different types of event data. For example, a heat map can represent two different types of user interactions (i.e. clicks and double clicks) and the heat-map module 250 can be configured to apply a different weight to each type of user interaction when calculating frequency. For example, a double click can be weighted to be counted as more than one event and thus a node can be incremented by greater than one when calculating frequency. Alternatively, a specific type of interaction can be weighted to be counted as less than one event and thus a node would be incremented by less than one when calculating frequency. Weighting based on the type of interaction is just one possible example of weighting. One skilled in the art would recognize that weighting can be applied to any number of criteria such as location, demographic data, etc.

In some embodiments, the heat-map module 250 can determine frequency based on all previous event data gathered regarding events occurring on the item of invitational content. In some embodiments, the heat-map module 250 can be configured to determine frequency based on a subset or segment of the event data. For example, frequency can be based on the event data gathered within a predetermined time such as within the previous day or week. In some embodiments, the event data can expire after a predetermined time such as a week and thus the resulting frequency data represents only the previous weeks' worth of event data.

The heat-map module 250 can be further configured to segment event data that is presented in a heat-map. The heat-map module 250 can be configured to segment the event data based on any type of criteria, such as demographic data, type of interaction, location of the data, type of user device, etc. In some embodiments, the heat-map module 250 can use event metadata transmitted with the event data to segment the event data. In some embodiments, the heat-map module 250 can be configured to communicate with the content server 205 to retrieve demographic data from the UUID database 235 to segment the event data.

In addition to presenting the event data in a heat-map, the event server 220 can also include an optimization module 260 configured to analyze the event data and determine optimization rules regarding the item of invitational content. For example, the optimization module can be configured to analyze the event data to determine which variant of an item of invitational content is optimal and determine optimization rules dictating which variant of invitational content should be selected. For example, in some embodiments, the optimization module 260 can evaluate the event data received in regards to multiple variants of the same item of invitational content to determine which variant is optimal. In some embodiments, the optimization module can evaluate the event data received in regards to a single item of invitational content to determine an optimal variant. The optimization module can determine optimization rules that dictate how variants of invitational content should be selected and transmit the rules to the content management module 225, which can use the optimization rules to select and assemble invitational content.

In some embodiments, the optimization module 260 can determine optimization rules that dictate which variant of invitational content to select based on the user terminal including demographic data associated with the user terminal. For example, the optimization rules can dictate which variant to select based on the location of the user terminal, the type of user terminal, demographic data of the user, etc. The optimization module 260 can determine this by comparing event data collected from specific demographic groups to determine which variant is best optimal for the group.

The optimization module 260 can determine which variant is optimal in numerous ways. For example, in some embodiments, the optimization module 260 can make the determination based upon a number or percentage of interactions that occurred in the correct location on the item of invitational content. Conversely, in some embodiments, the optimization module 260 can make the determination based upon a number or percentage of interactions that did not occur in a correct location. Further, in some embodiments, the location of event data can be evaluated based upon a location range or set of ranges around a correct location, rather than just within the correct location. These are just some examples of how an optimal variant can be determined. One skilled in the art would recognize that this determination can be made in any number of ways using any number of criteria.

Figure 3:
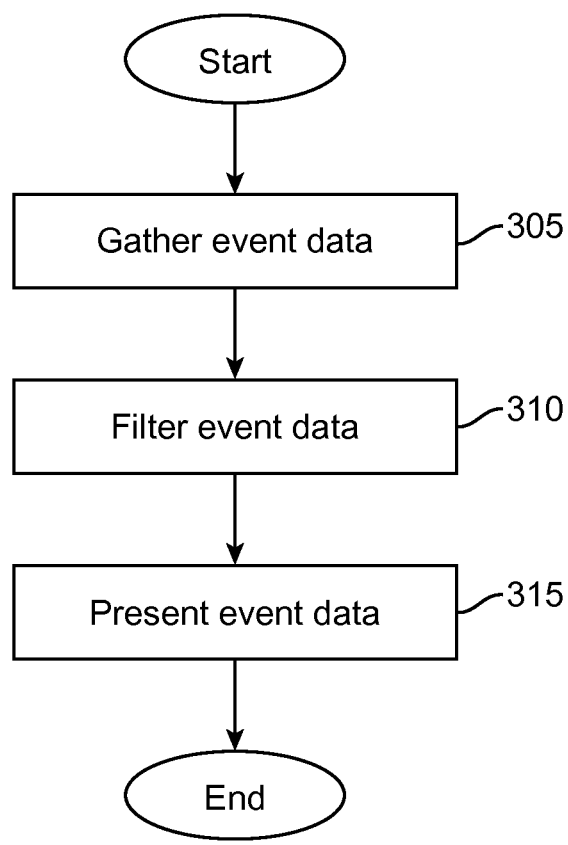
FIG. 3 illustrates an exemplary method embodiment of displaying event data in a heat-map interface.

FIG. 3 illustrates an exemplary method embodiment of displaying event data in a heat-map interface. As illustrated, the method begins at block 305 with event data being gathered. Event data can be data indicating user interactions in relation to an item of invitational content rendered on a user computing device. The event data can be gathered as a user interacts with an item of invitational content through use of an input device included in the user computing device. For example, event data can be gathered from an input device such as a touch screen on the user device. In addition to data indicating a user interaction, the event data can also include event metadata describing the interaction. For example, the metadata can include the location of the interaction, the item of invitational content the interaction was performed in relation to, data describing the user device, including current settings, demographic data associated with the user device, etc.

Upon gathering the event data, the method continues to block 310 where the event data is filtered to exclude event data determined to be unnecessary. For example, event data that will not be represented on the heat-map can be determined to be unnecessary and thus filtered out from the gathered event data.

In some embodiments, the event data can filtered based upon a determined user interaction. For example, the event data can be analyzed to determine an intended user interaction. Even data relating to user interactions that will not be represented in the heat-map can be filtered out and excluded from the event data.

In some embodiments, the event data can be filtered based upon the item of invitational content that the event data is in relation to. For example, event data gathered from only certain items of invitational content can be included in the heat-map and thus event data gathered from other items of invitational content can be excluded.

In some embodiments, the event data can be filtered based upon the user computing device. For example, event data gathered from certain types of computing devices can be excluded.

In some embodiments, the event data can be filtered based upon demographic data associated with the user device. For example, event data gathered from users within certain demographic groups can be excluded.

In some embodiments, the filtering can be performed based upon filtering rules determined by the system. The item of invitational content can be analyzed and the filtering rules can be determined based on the analysis. For example, the analysis of the item of invitational content can provide what user interactions are available in the item of invitational content and the filtering rules can dictate that interactions not included be excluded from the event data. In some embodiments, the filtering rules can be determine by identifying user interactions for the item of invitational content and determining at least one possible intent for each of the available user interactions. The intent can be associated with a computed confidence score and the filtering rules can specify to exclude available user interactions that fail to meet a confidence score criteria.

In some embodiments, the analysis of the item of invitational content can provide the location of actionable areas within the item of invitational content. An actionable area can be an area of the invitational content configured to respond to user interaction. The filtering rules can be configured to dictate what event data should be excluded based upon the actionable areas. For example, the rules can dictate that any event data that takes place over a specified distance from an actionable area should be excluded from the event data.

In some embodiments, the filtering rules can dictate what event data should be excluded based upon performance factors such as the network connection associated with the user terminal or current resource usage. For example, the filtering rules can dictate a predetermined minimum amount of event data that is should never be excluded as well as further event data that should not be excluded based upon the current performance of the system. For example, the filtering rules can dictate that the further event data not be excluded upon a determination that the further event data can be included without a drop off in performance of the system. The range of event data to excludes thus varies and can be dynamically adjusted based upon the current network capabilities of the user device. For example, if it is determined that the current network capabilities are low, the filtering rules can dictate that a larger amount of event data be excluded. Thus the amount of event data excluded is proportionate to the current capabilities of the system.

After the even data is filtered, the method continues to block 315 where the filtered event data is presented in a heat-map interface. A heat map interface can present the event data based on a determined frequency that events occurred at specific locations of the item of invitational content. The heat-map interface can be displayed in numerous ways, using any number of techniques to represent frequency. For example, frequency can be represented by color, grayscale, letters, numbers, patterns, etc.

Further, the heat-map can represent all the event data or a subset or segment of the event data. For example the event data can be segmented based on demographic data, the type of user computing device, location of the user computing device, etc. The heat-map can be created by aggregating the filtered event data based on aggregation rules that specify how to aggregate the event data. For example, the aggregation rules can specify dividing the filtered event data into groups based on user interaction type criteria and the heat-map can be created to correspond to one of the groups. User interaction type criteria can be any type of criteria such as user computing device criteria, temporal criteria, demographic criteria, geo-location criteria, KPI, etc.

Figure 4:
FIG. 4 illustrates a screenshot of an exemplary embodiment of a heat-map interface.

FIG. 4 illustrates a screenshot of an exemplary embodiment of a heat-map interface. As illustrated, the heat-map can be presented over the item of invitational content so that item of invitational content is visible below. This can allow the heat-map to clearly represent the frequency at each location on the item of invitational content. Further, the heat-map can be represented using different colors or shades to signify different frequencies.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method, comprising:
receiving, by a processor, event data describing user input detected within a rendered image portion of an invitational content item while the invitational content item was rendered by a user computing device, wherein:
the invitational content item includes a first actionable area that is configured to receive a user input that results in a specified response,
the first actionable area is presented within the rendered image portion of the invitational content item, and
for each user input described by the event data, the event data includes coordinates identifying a point within the rendered image portion of the invitational content item where the user input was detected;
identifying, by the processor, based on the coordinates identifying the point where the user input was detected, a subset of the event data that describes user input detected at any point of the rendered image portion of the invitational content item that is not within a predetermined distance from the first actionable area of the invitational content item;
removing, by the processor, the subset of the event data from the event data, yielding filtered event data that describes user input detected within the predetermined distance from the first actionable area; and
generating, by the processor, from the filtered event data, a dataset showing a pattern of user input with the invitational content item.

2. The method of claim 1, wherein the dataset comprises a heat-map indicating a frequency of the user input from the filtered event data at each point within the rendered image portion of the invitational content item.

3. The method of claim 1, wherein the method further comprises:
grouping the event data in the filtered event data into groups based on a user input type criteria that describes the user input.

4. The method of claim 3, wherein the user input type criteria specifies at least one of user computing device criteria, a temporal criteria, a demographic criteria, a key performance indicator criteria or a geo-location criteria.

5. The method of claim 1, further comprising:
identifying a second subset of the event data that describes user input that does not correspond to at least one available user interaction type for the first actionable area, wherein the removing further comprises removing the second subset of the event data from the event data to yield the filtered event data.

6. The method of claim 1, further comprising:
identifying a second subset of the event data that describes user input that does not correspond to at least one pre-defined type of user input, wherein the removing further comprises removing the second subset of the event data from the event data to yield the filtered event data.

7. The method of claim 1, further comprising:
determining a location of the first actionable area; and
identifying at least one available user input type for interacting with the first actionable area.

8. A system, comprising:
a processor; and
a memory containing instructions that, when executed, cause the processor to:
receive event data describing user input detected within a rendered image portion of an invitational content item while the invitational content item was rendered by a user computing device, wherein:
the invitational content item includes a first actionable area that is configured to receive a user input that results in a specified response,
the first actionable area is presented within the rendered image portion of the invitational content item, and
for each user input described by the event data, the event data includes coordinates identifying a point within the rendered image portion of the invitational content item where the user input was detected;
identify, based on the coordinates identifying the point where the user input was detected, a subset of the event data that describes user input detected at any point of the rendered image portion of the invitational content item that is not within a predetermined distance from the first actionable area of the invitational content item;
remove the subset of the event data from the event data, yielding filtered event data that describes user input detected within the predetermined distance from the first actionable area; and generate, from the filtered event data, a dataset showing a pattern of user input with the invitational content item.

9. The system of claim 8, wherein the dataset comprises a heat-map indicating a frequency of the user input from the filtered event data at each point within the rendered image portion of the invitational content item.

10. The system of claim 8, wherein the instructions further causer the processor to:
group the filtered event data into groups based on a user input type criteria that describes the user input.

11. The system of claim 10, wherein the user input type criteria specifies at least one of user computing device criteria, a temporal criteria, a demographic criteria, a key performance indicator criteria or a geo-location criteria.

12. The system of claim 8, wherein the instructions further cause the processor to:
identify a second subset of the event data that describes user input that does not correspond to at least one available user interaction type for the first actionable area, wherein the removing further comprises removing the second subset of the event data from the event data to yield the filtered event data.

13. The system of claim 8, wherein the instructions further cause the processor to:
identify a second subset of the event data that describes user input that does not correspond to at least one pre-defined type of user input, wherein the removing further comprises removing the second subset of the event data from the event data to yield the filtered event data .

14. The system of claim 8, wherein the instructions further cause the processor to:
determine a location of the first actionable area; and
identify at least one available user input type for interacting with the first actionable item.

15. A non-transitory computer-readable medium containing instructions that, when executed by a computing device, cause the computing device to:
receive event data describing user input detected within a rendered image portion of an invitational content item while the invitational content item was rendered by a user computing device, wherein:
the invitational content item includes a first actionable area that is configured to receive a user input that results in a specified response,
the first actionable area is presented within the rendered image portion of the invitational content item, and
for each user input described by the event data, the event data includes coordinates identifying a point within the rendered image portion of the invitational content item where the user input was detected;
identify, based on the coordinates identifying the point where the user input was detected, a subset of the event data that describes user input detected at any point of the rendered image portion of the invitational content item that is not within a predetermined distance from the first actionable area of the invitational content item;
remove the subset of the event data from the event data, yielding filtered event data that describes user input detected within the predetermined distance from the first actionable area; and
generate, from the filtered event data, a dataset showing a pattern of user input with the invitational content item.

16. The non-transitory computer-readable medium of claim 15, wherein the dataset comprises a heat-map indicating a frequency of the user input from the filtered event data at each point within the rendered image portion of the invitational content item.

17. The non-transitory computer-readable medium of claim 15, wherein the instructions further causer the computing device to:
group the filtered event data into groups based on a user input type criteria that describes the user input.

18. The non-transitory computer-readable medium of claim 17, wherein the user input type criteria specifies at least one of user computing device criteria, a temporal criteria, a demographic criteria, a key performance indicator criteria or a geo-location criteria.

19. The non-transitory computer-readable medium of claim 15, wherein the instructions further cause the computing device to:
identify a second subset of the event data that describes user input that does not correspond to at least one available user interaction type for the first actionable area, wherein the removing further comprises removing the second subset of the event data from the event data to yield the filtered event data.

20. The non-transitory computer-readable medium of claim 15, wherein the instructions further cause the computing device to:
identify a second subset of the event data that describes user input that does not correspond to at least one pre-defined type of user input, wherein the removing further comprises removing the second subset of the event data from the event data to yield the filtered event data .

21. The non-transitory computer-readable medium of claim 15, wherein the instructions further cause the computing device to:
determine a location of the first actionable area; and
identify at least one available user input type for interacting with the first actionable item.

* * * * *